US005593197A

United States Patent [19]

Mathieu et al.

[11] Patent Number: 5,593,197

[45] Date of Patent: Jan. 14, 1997

[54] SPARK PLUG WIRE PULLER

[75] Inventors: Raymond J. Mathieu, Troy; James F. Mellott, Washington; Dean E. Myers, South Solon, all of Ohio

[73] Assignee: MAC Tools, Inc., Columbus, Ohio

[21] Appl. No.: 403,056

[22] Filed: Mar. 13, 1995

Related U.S. Application Data

[63] Continuation of Ser. No. 194,615, Feb. 10, 1994, abandoned.

[51] Int. Cl.$^{6}$ .................................................... B25J 15/08

[52] U.S. Cl. ........................................ 294/19.1; 294/116

[58] Field of Search .......................... 294/11, 19.1–19.3, 294/22, 23, 34, 50.5–50.9, 103.1, 104, 115, 116; 29/235, 267, 268, 270, 278, 280; 81/487, 488

[56] References Cited

U.S. PATENT DOCUMENTS

| | | | |
|---|---|---|---|
| D. 237,247 | 10/1975 | Nocleby | 294/19.1 X |
| 682,021 | 9/1901 | Bennett | 294/50.8 |
| 755,454 | 3/1904 | Clear | 294/11 |
| 886,003 | 4/1908 | Kraft | 294/19.3 |
| 1,220,899 | 3/1917 | Sorensen | 294/115 |
| 1,377,933 | 5/1921 | Sheatsley | 294/115 X |
| 1,516,844 | 11/1924 | Cross | 294/116 X |
| 1,642,639 | 9/1927 | Born | 294/115 |
| 2,469,865 | 5/1949 | Crow | 294/19.1 X |
| 3,654,686 | 4/1972 | McFarland et al. | 294/19.1 X |
| 5,253,408 | 10/1993 | Wright | 294/19.1 X |

FOREIGN PATENT DOCUMENTS

| | | | |
|---|---|---|---|
| 766929 | 7/1934 | France | 294/22 |
| 1444278 | 12/1988 | U.S.S.R. | 294/116 |

*Primary Examiner*—Johnny D. Cherry
*Attorney, Agent, or Firm*—Standley & Gilcrest

[57] ABSTRACT

A spark plug wire puller is described which is actuated by a user squeezing a trigger biased against a handle of the tool which causes two jaw members to come together at gripping ends thereof to squeeze a wire or boot. As the user squeezes the trigger and pulls on the tool, the jaws grip the wire or boot and remove it from the spark plug. The invention is advantageous because it does not rely on a scissors action and it grips the boot in such a way so as not to damage it during the removal process.

1 Claim, 2 Drawing Sheets

SPARK PLUG WIRE PULLER

RELATED APPLICATIONS

The present application is a continuation application for U.S. patent application Ser. No. 08/194,615, filed Feb. 10, 1994, entitled "Spark Plug Wire Puller", now abandoned.

BACKGROUND AND SUMMARY OF THE INVENTION

The present invention is generally related to hand tools, and more particularly, to a hand tool which is capable of use in connection with removing spark plug wires during repair and maintenance of engines such as those on motor vehicles.

It is very common in most motorized vehicles for the motor to include spark plugs. Each spark plug typically has a wire connected to it which leads from the spark plug to another component associated with the motor, such as a distributor. At the connection where the wire meets the spark plug, a boot is usually provided with the wire for securement over the spark plug. It can sometimes be difficult to remove the boot and wire from a spark plug, especially in hard to reach areas. For example, in some engine compartments of vehicles, there is not sufficient room for a technician's hand to maneuver within the space surrounding a spark plug in order to grip the wire and/or boot to remove the wire from the spark plug.

It has been known to use various devices to assist in removing spark plug wires. However, many of these devices suffer from various disadvantages. For example, some incorporate a scissors type action for maneuvering around the spark plug and gripping the wire and/or boot. The scissors action requires more room to operate which may not be available in some engine compartments. Other devices have been used which fit under or behind a boot and allow it to be pulled. However, even such a simple design may not be effective in areas where space is limited, where the spark plug is recessed, or where the boot condition has deteriorated.

The present invention is designed to overcome the aforementioned disadvantages. The present invention incorporates a unique actuation method that requires less space to operate.

A handle assembly is provided connected to a jaw assembly. The handle assembly includes a squeezable trigger. When the trigger is squeezed the jaws are caused to come together to grip a spark plug wire boot, for example. Once the trigger is squeezed and the boot is grasped, the user pulls on the tool while continuing to squeeze the trigger, resulting in the boot being pulled off the spark plug.

The jaws of the present invention are also designed to fit into close clearance spark plug holes. The present invention may be used in repair and service of automobiles, trucks, light aircraft, boats mid other spark ignited devises. Uses other than spark plug wire removal may also be accomplished by the present invention. For example, certain automobile heater hoses may be removed using the present invention.

Other features and advantages of the present invention will be apparent from the following detailed description of a preferred embodiment and from the attached drawings.

DETAILED DESCRIPTION OF PREFERRED EMBODIMENT(S)

Figure 1:
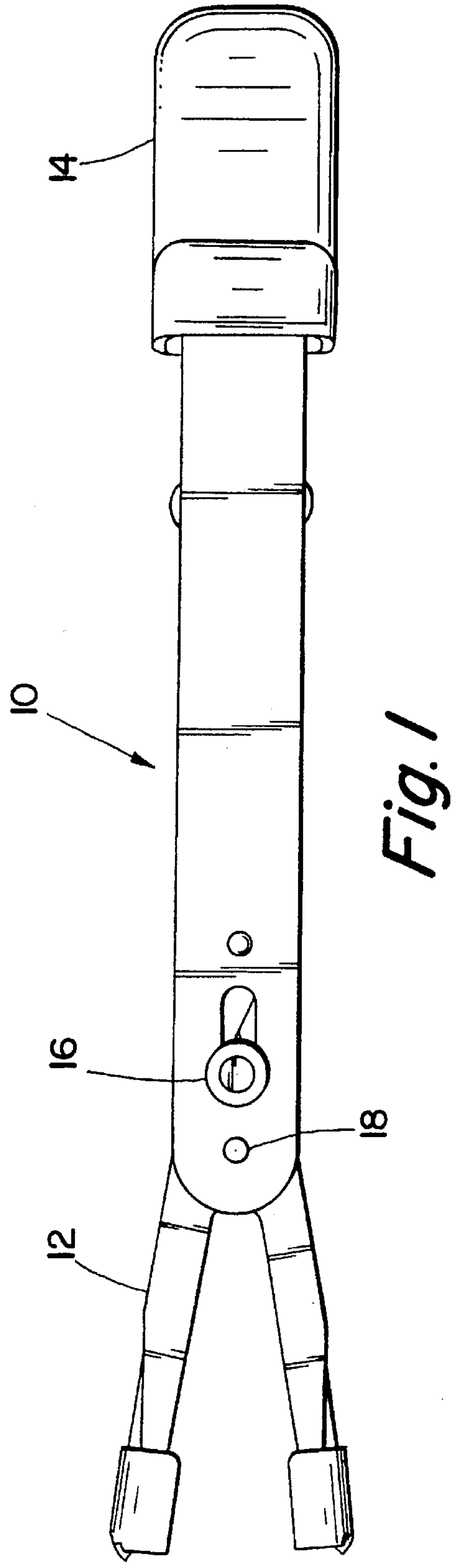
FIG. 1 is a plan view of the tool of the present invention.

Referring now to the drawings, there is shown in FIG. 1 a preferred embodiment of the spark plug wire puller tool (10) of the present invention. Major components of the tool (10) include a jaw assembly (12) and a handle assembly (14). One end of the handle assembly (14) is gripped by a user's hand and squeezed to activate the jaw assembly (12), causing the jaws to grip a spark plug wire boot, while the user exerts a pulling force on the tool (10) causing the boot to be removed from the spark plug. The jaw assembly is activated by cam (16) which causes the jaw assembly to rotate on pivot (18).

Figure 2:
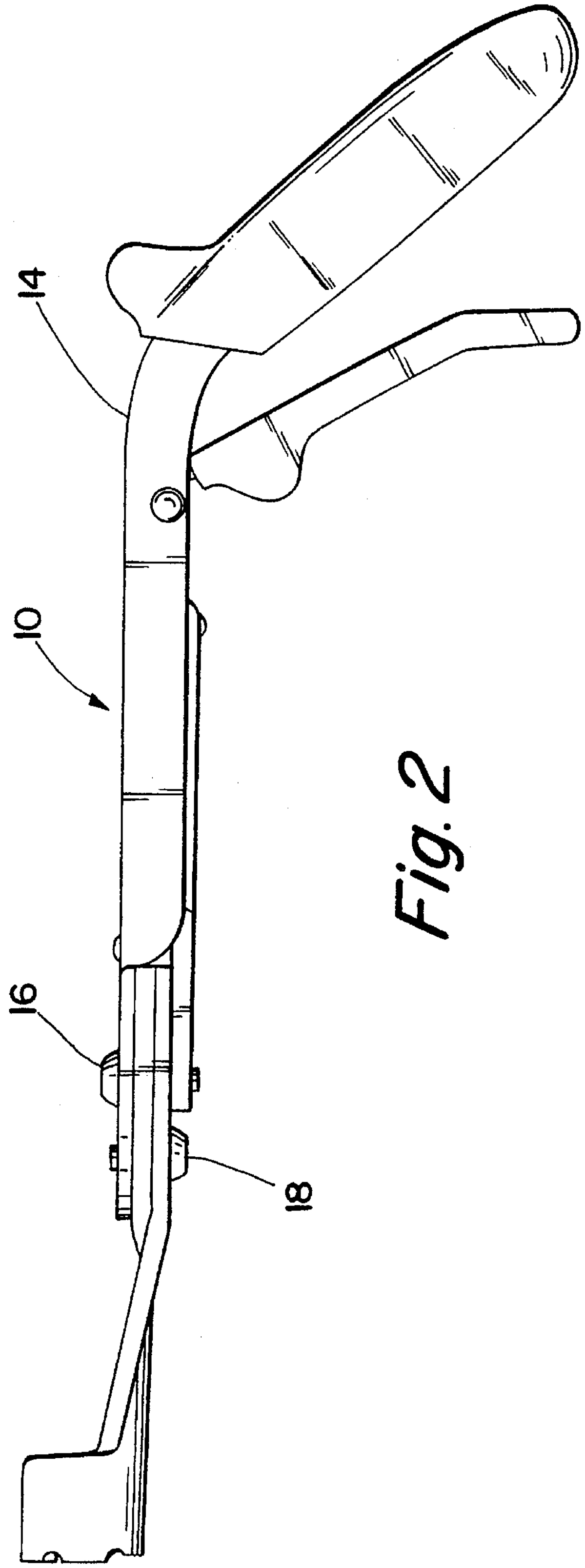
FIG. 2 is a side elevation view of the tool of the present invention.
Figure 3:
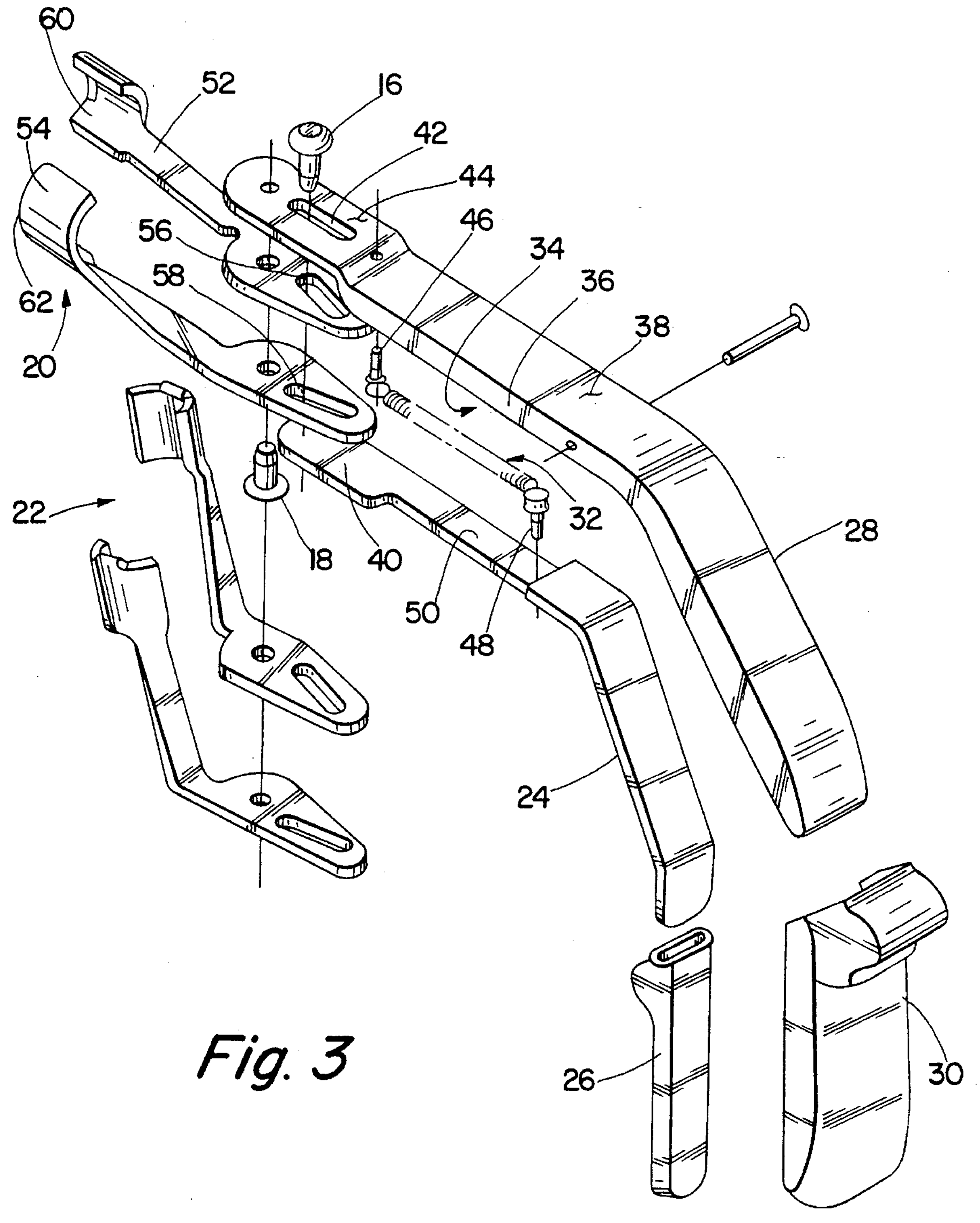
FIG. 3 is an exploded assembly view of the tool of the present invention.

A side view of the tool (10) is shown in FIG. 2 and an exploded assembly view of the tool is shown in FIG. 3. The jaw assembly (12) may include straight jaw members (20) or angled jaw members (22). The handle assembly (14) preferably includes a trigger member (24) which may have connected thereto, at a proximal end thereof, a trigger grip (26). In another embodiment of the present invention, the trigger member (24) and trigger grip (26) may be made as one piece. Preferably, the handle assembly (14) further includes a handle arm (28) having attached thereto, at a proximal end thereof, a handle grip (30).

The various components described above may be assembled as shown in FIG. 3. A spring (32) may be placed within the handle ann (28) in such a way so as to bias against the trigger member (24) to result in the trigger grip (26) being forced in a direction away from the handle grip (30) when the tool is not in use. When the tool is in use, the handle grip (30) is gripped by a user's hand and the user's fingers preferably wrap around the trigger grip (26), such that when the user's hand squeezes the trigger grip (26), extending the spring (32) toward the handle grip (30), the jaw members are resultantly caused to move in a direction toward the opposing jaw member to grip whatever lies between the jaw members. Cam (16) is attached to trigger member (24) and passes through slots in the jaw members. Pivot (18) is attached to the handle arm (28) and allows the jaw members to pivot and grip an object when the trigger grip (26) is squeezed.

The present invention enables a user to squeeze the grips (26), (30) while pulling on the tool (10) at the same time to remove a spark plug wire. The natural tendency to squeeze the grips (26), (30) as the user pulls on the tool to remove the spark plug wire from the spark plug is a unique advantage of the present invention. As the user increases the strength of grip on the trigger, the jaws increase the strength of grip on the object the jaws are gripping.

Detailed operation of the present invention may be more easily understood with reference to FIGS. 1–3 and the following explanation. An operator may grip handle and trigger grips, 26 and 30, and place jaw members 20 about a spark plug wire boot. When the operator squeezes the grips, 26 and 30, toward each other, trigger member 24 slides in relation to handle arm 28. Handle arm 28 may have an elongate trigger cavity 34 flanked by downwardly depending flanges 36 which extend from an upper surface 38 of handle arm 28. Trigger member 24 may reside within the elongate trigger cavity 34 and be guided by the flanges 36 during the sliding. Cam 16 may be connected to a distal end 40 of the trigger member 24. The cam 16 will slide within a cam slot 42 within a distal end 44 of the handle arm 28. The cam slot 42 is longitudinal to permit the cam 16 to slide along a single axis within the cam slot 42. The sliding relationship between cam 16 and the cam slot 42 serves to provide guidance, in addition to the elongate trigger cavity 34, to the trigger member 24 when sliding in relation to the handle arm 28.

A spring 32 may be used to bias the trigger grip 26 away from the handle grip 30 and to provide a force to oppose an operator's squeezing grip. It is to be understood that spring 32 may comprise any spring which may serve to bias the grips, 26 and 30, in the manner explained. In the embodiment shown in the figures, sprig 32 is connected to the handle 28 with a first spring retainer 46 and is connected to the trigger 24 with a second spring retainer 48. When the operator squeezes the grips, 26 and 30, toward each other, the trigger 24 slides relative to the handle 28 and serves to extend the spring 32. When the operator releases the squeezing pressure on the grips, 26 and 30, the spring 32 tends to return to its original length and thereby move the grips, 26 and 30, away from each other. As the trigger 24 slides relative to handle 28, the cam 16 also slides relative to the cam slot 42. Preferably, the spring 32 biases the cam 16 toward one end of cam slot 42. Additionally, trigger 24 may have a spring cavity 50 within which the spring 32 may be received.

The explanation thus far has focused upon the dynamic relationship between the handle 28 and the trigger 24. However, this relationship is merely the means by which an end is achieved. The end being achieved is that of opening and closing jaw members 20 or 22. At the distal end 44 of handle 28 a pivot 18 is attached. A first jaw member 52 and a second jaw member 54 are rotatably mounted upon pivot 18. First jaw member 52 has a second cam slot 56 through which cam 16 passes. Second jaw member 54 has a third cam slot 58 through which cam 16 passes. Thus, cam 16 passes through three cam slots 42, 56 and 58. The cam slots 42, 56, and 58 are arranged with respect to each other to enable the distal ends 60 and 62 of jaw members 52 and 54 respectively to move toward each other when the cam 16 slides away from the pivot 18. The second cam slot 56 crosses the first cam slot 42 in a first direction and the third cam slot 58 crosses the first cam slot 42 in a second direction. Preferably, the first and second directions oppose each other. When an operator squeezes grips 26 and 30 toward each other, the trigger 24 slides in relation to handle 28. The cam 16, being connected to the trigger 24 moves away from the pivot 18 which is connected to the handle 28. As the cam 16 moves away from the pivot 18 it slides within second and third cam slots, 56 and 58, within first and second jaw members 52 and 54 and thereby moves the distal ends 60 and 62 of the jaw members toward each other. If the distal ends, 60 and 62, surround a spark plug wire boot the above-described component interaction will result in the spark plug wire boot being gripped by the ends 60 and 62.

The present invention may be manufactured with blanked and formed metal parts assembled by traditional fasteners such as screws, rivets, and the like. The inner portion of each jaw member may be enhanced in some way to provide a better gripping surface.

The features and advantages of the present invention are intended to be captured in the following claims. The invention may lend itself to various modifications and enhancements which are intended to be included within the scope of the following claims.

What is claimed is:

1. A spark plug wire puller, comprising:

an elongate handle having a distal end and a proximal end, wherein said handle has a pivot at said distal end, wherein said handle has a first longitudinal cam slot adjacent said pivot, wherein said handle has an elongate trigger cavity extending from said distal end to said proximal end, wherein said handle has a first spring retainer located between a proximal end of said longitudinal slot and a distal end of said trigger cavity;

a handle grip on said proximal end of said handle;

an elongate trigger received in said elongate trigger cavity having a distal end and a proximal end, wherein said trigger has a cam at said trigger distal end, wherein said trigger has an elongate spring cavity, wherein said trigger has a second spring retainer at a proximal end of said spring cavity, wherein said cam extends through said first longitudinal cam slot;

a trigger grip on said proximal end of said trigger;

an elongate spring located within said spring cavity of said trigger and attached to said first spring retainer at a distal end of said spring and to said second spring retainer at a proximal end of said spring;

a first elongate jaw member having a distal end and a proximal end and an inside and an outside, wherein said first jaw member rotates about said pivot, wherein said first jaw member has a spark plug wire grip on said inside at said distal end, wherein said first jaw member has a second longitudinal cam slot for receiving said cam, wherein said second longitudinal cam slot crosses said first cam slot in a first direction;

a second elongate jaw member having a distal end and a proximal end and an inside and an outside, wherein said second jaw member rotates about said pivot, wherein said second jaw member has a spark plug wire grip on said inside at said distal end, wherein said second jaw member has a third longitudinal cam slot for receiving said cam, wherein said third longitudinal cam slot crosses said first cam slot in a second direction that opposes said first direction, wherein said spark plug wire grip of said first jaw member faces said spark plug wire grip of said second jaw member, wherein said spark plug wire puller operates when said trigger grip is moved toward said handle grip thereby moving said cam in said first cam slot away from said pivot toward said proximal end of said handle and toward said proximal ends of said jaw members thereby forcing said jaw members to rotate about said pivot and to thereby move said spark plug wire grips closer to each other to grip a spark plug wire boot.

* * * * *

UNITED STATES PATENT AND TRADEMARK OFFICE

CERTIFICATE OF CORRECTION

PATENT NO. : 5,593,197
DATED : January 14, 1997
INVENTOR(S) : Raymond J. Mathieu, et al.

It is certified that error appears in the above-identified patent and that said Letters Patent is hereby corrected as shown below:

In column 2, line 33, please delete the word "ann" and replace it with -- arm --.

In column 3, line 14, please delete the word "sprig" and replace it with -- spring --.

Signed and Sealed this

Eighth Day of April, 1997

*Attest:*

BRUCE LEHMAN

*Attesting Officer* *Commissioner of Patents and Trademarks*